Feb. 15, 1927.
L. C. JOSEPHS, JR
1,617,715
BOGIE TRUCK FOR SELF PROPELLED RAIL CARS
Original Filed Aug. 15, 1923
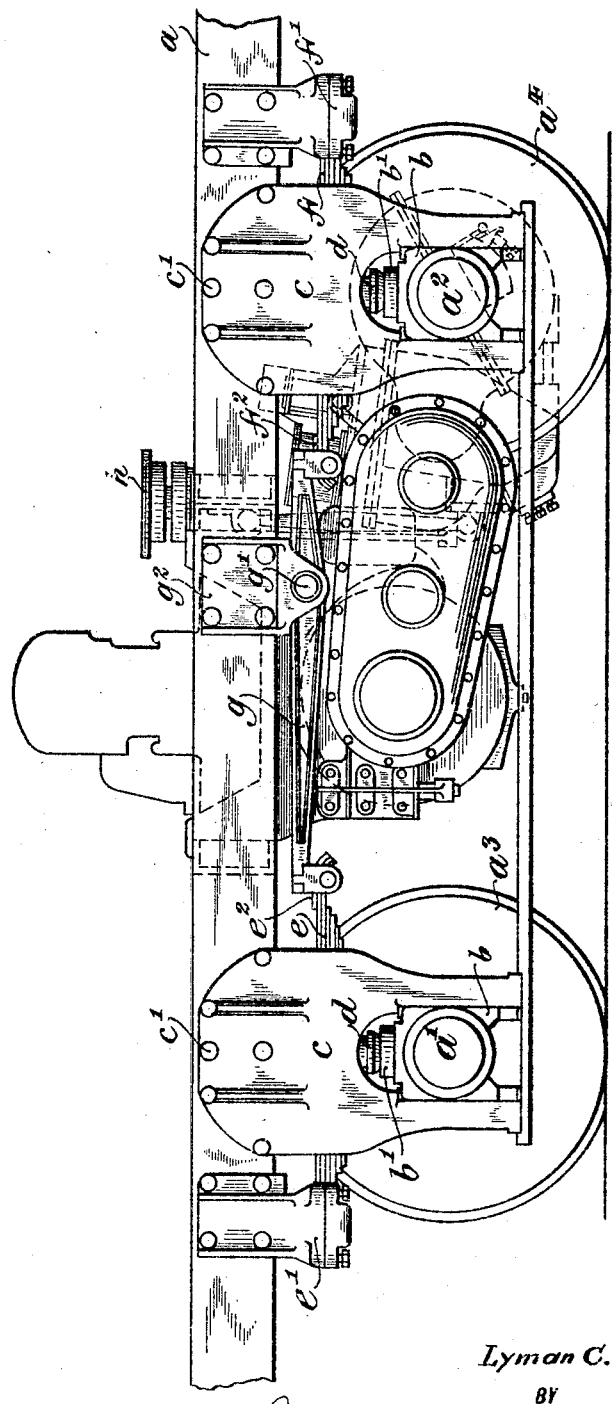
INVENTOR
Lyman C. Josephs, Jr.
BY
Redding, Greeley, O'Shea & Campbell ATTORNEYS Patented Feb. 15, 1927.

1,617,715

UNITED STATES PATENT OFFICE.

LYMAN C. JOSEPHS, JR., OF ALLENTOWN, PENNSYLVANIA, ASSIGNOR TO INTERNATIONAL MOTOR COMPANY, OF NEW YORK, N. Y., A CORPORATION OF DELAWARE.

BOGIE TRUCK FOR SELF-PROPELLED RAIL CARS.

Original application filed August 15, 1923, Serial No. 657,482, now Patent No. 1,532,699, dated April 7, 1925. Divided and this application filed February 3, 1925. Serial No. 6,504.

In the co-pending application by the present applicant, Serial No. 657,482, filed August 15, 1923, now Patent No. 1,532,699, granted April 7, 1925, for bogie truck for self-propelled rail cars there is disclosed an invention relating generally to features of construction of a bogie truck for rail cars propelled by an internal combustion engine but which also includes features of construction in which the truck is self-propelled, that is, itself carries the internal combustion engine and transmission for the car. The present application is a divisional application of the co-pending application and is addressed particularly to details having to do with the mounting of the springs on the axles to the end that weights will be properly distributed, suitable rigidity assured and an easy riding suspension obtained in which comparatively free relative motion is afforded between parts at those points where most important. Another feature of the invention has to do with the supporting of the car body on the truck on a king pin, and the transmission of the load to the springs through equalizing bars whereby all four wheels of the truck may be maintained on the rails when passing over inequalities in the track. In accomplishing the purposes of the invention it is proposed to provide two sets of springs having their remote ends fixed in a yielding anchorage and their inner ends free to move under elongation with respect to the equalizing levers. In such a construction it is further proposed to mount the springs in such relation to the axles as to be movable relatively therewith under elongation. In the drawings there is illustrated in side elevation the improved truck and suspension elements as the preferred embodiment of the invention reference being had to the following detailed description for a more particular understanding thereof.

The truck includes a chassis made up of frame members $a$ which extend along the sides and across the ends (although the end frame members are omitted in the drawings) and this chassis is supported on axles $a'$, $a^2$, carried with flanged wheels $a^3$, $a^4$, mounted through journal boxes $b$ movable vertically within depending slotted brackets $c$ bolted rigidly as at $c'$ to the side frame members. On the journal boxes are carried pedestals $b'$ which have their upper surfaces formed as cups to receive the spherical lower ends of spring posts $d$ on which are supported at the mid-sections leaf springs $e$, $f$, over the respective axles $a'$, $a^2$. These springs, of course, are disposed in pairs on the journal boxes at opposite ends of the respective axles. The problem is to support the weight of the car body on the journal boxes and the intermediary of these springs in such manner as to give the best riding qualities, adequate ruggedness, and permit the necessary elongation of the various springs under relative movements between the various journal boxes and the chassis of the truck. These purposes are accomplished in the improved construction by mounting the remote ends of the various springs in rubber blocks in accordance with Letters Patent of the United States No. 1,404,876, dated January 31, 1922. In side elevation the springs $e$ and $f$ have their remote ends supported yieldingly in such nonmetallic connections, not illustrated in detail but represented by the housings $e'$, $f'$, respectively, bolted to the side frame member $a$ and having open sides to admit the ends of the respective springs and confining the ends by means of rubber blocks seated within said housings. The proximate ends of the respective pairs of springs are not fixed relatively but are connected to the chassis of the truck loosely and in such manner as to admit of free elongation. To this end, the springs $e$ and $f$ (as well as the other springs of the pair) have on their proximate ends plates $e^2$, $f^2$, on which rest the ends of an equalizing bar $g$ pivoted as at $g'$ in a bracket $g^2$ bolted to the chassis. The car body (not illustrated) is connected to the truck chassis through the king pin connection $h$ which may be of any suitable form.

The action of the suspension described is as follows: The remote ends of the various springs $e$, $f$, are relatively fixed in the connections indicated at $e'$, $f'$ while their proximate ends are free to move with respect to each other through the equalizing bar $g$ which rests thereon. Application or apportioning of the load on the various springs according to the distribution thereof is secured by placing the pivot $g'$ for the equalizer bar coincident with the center of load; the application of the load generally between the two axles $a'$, $a^2$ being controlled by the point at which the king pin connection $h$ is disposed between these two axles. In the case of a truck which is not self-propelled it may be satisfactory to distribute the load equally to the four springs but in the case of a self-propelled truck, as illustrated, it may be desirable, in the interest of traction, to pace a larger portion of the load on the driving axle $a^2$. With the remote ends of the springs $e$, $f$, relatively fixed in the housings $e'$, $f'$, it is evident that the elongation of the springs will bring about a displacement of the supporting posts $d$ with respect to the socket pedestals $b'$ in which they rest on the journal boxes $b$. Since the pedestals are formed with cup-like seats on their upper surfaces and since the bearing ends of the posts $d$ are spherical but of a diameter smaller than that of the seat, relative displacement therebetween is facilitated. Since the journal boxes $b$ are confined by the brackets $c$, driving, pulling and braking forces between the axles and the trucks will be transmitted.

By the construction described full spring suspension for the motor is obtained. Changes in details of design and arrangement may be made without departing from the spirit of the invention.

What I claim is:

1. In combination with the chassis of a bogie truck wherein certain wheels of said truck are driving wheels, supporting axles and wheels, springs to support the chassis on the axles, means to support one end of each of the springs on the chassis, a support for the springs on the respective axles relatively movable with respect to said axles, means to connect the other end of each of said springs operatively with the truck chassis and with capacity for free relative movement thereto, such means including means to apportion a greater part of the weight upon the driving wheels than upon the idlers and a king pin connection between the truck chassis and the load disposed at one side of the mid-point between the two axles.

2. In a bogie truck in combination with the chassis, axles and wheels, pairs of springs supported on the respective axles and having one end relatively fixed with respect to the truck chassis, an equalizing bar connected loosely with the free end of aligned springs on adjacent axles, means to connect the equalizer bar pivotally but off center, to the truck chassis, and a king pin connection between the truck chassis and the load disposed at one side of the mid-point between the two axles.

This specification signed this 29th day of January A. D. 1925.

LYMAN C. JOSEPHS, JR.